United States Patent [19]

Iwashita et al.

[11] 3,981,022
[45] Sept. 14, 1976

[54] CAMERA HAVING AN ELECTRIC DRIVING DEVICE

[75] Inventors: Tomonori Iwashita, Chofu; Hiroshi Aizawa, Machida; Susumu Kozuki, Yokohama; Masanori Uchidoi, Kawasaki, all of Japan

[73] Assignee: Canon Kabushiki Kaisha, Tokyo, Japan

[22] Filed: Aug. 6, 1974

[21] Appl. No.: 495,247

[30] Foreign Application Priority Data

| | | |
|---|---|---|
| Aug. 10, 1973 | Japan | 48-89839 |
| Aug. 10, 1973 | Japan | 48-89840 |
| Aug. 10, 1973 | Japan | 48-89841 |
| Aug. 10, 1973 | Japan | 48-89842 |

[52] U.S. Cl. ............................................. 354/171
[51] Int. Cl.² .......................................... G03B 1/18
[58] Field of Search ................................. 354/171

[56] References Cited

UNITED STATES PATENTS 3,688,669   9/1972   Ogiso et al. .................. 354/171

*Primary Examiner*—L. T. Hix
*Assistant Examiner*—John M. Horan
*Attorney, Agent, or Firm*—Toren, McGeady and Stanger

[57] ABSTRACT

A camera being so composed as having an electric driving device which has a means to detect completion signals for each of such actions as film wind up, shutter release, film rewinding preparation and film rewinding, wherein an electric motor is controlled by said signals to perform each action of film wind up, shutter release and film rewinding automatically and in time sequence.

5 Claims, 5 Drawing Figures

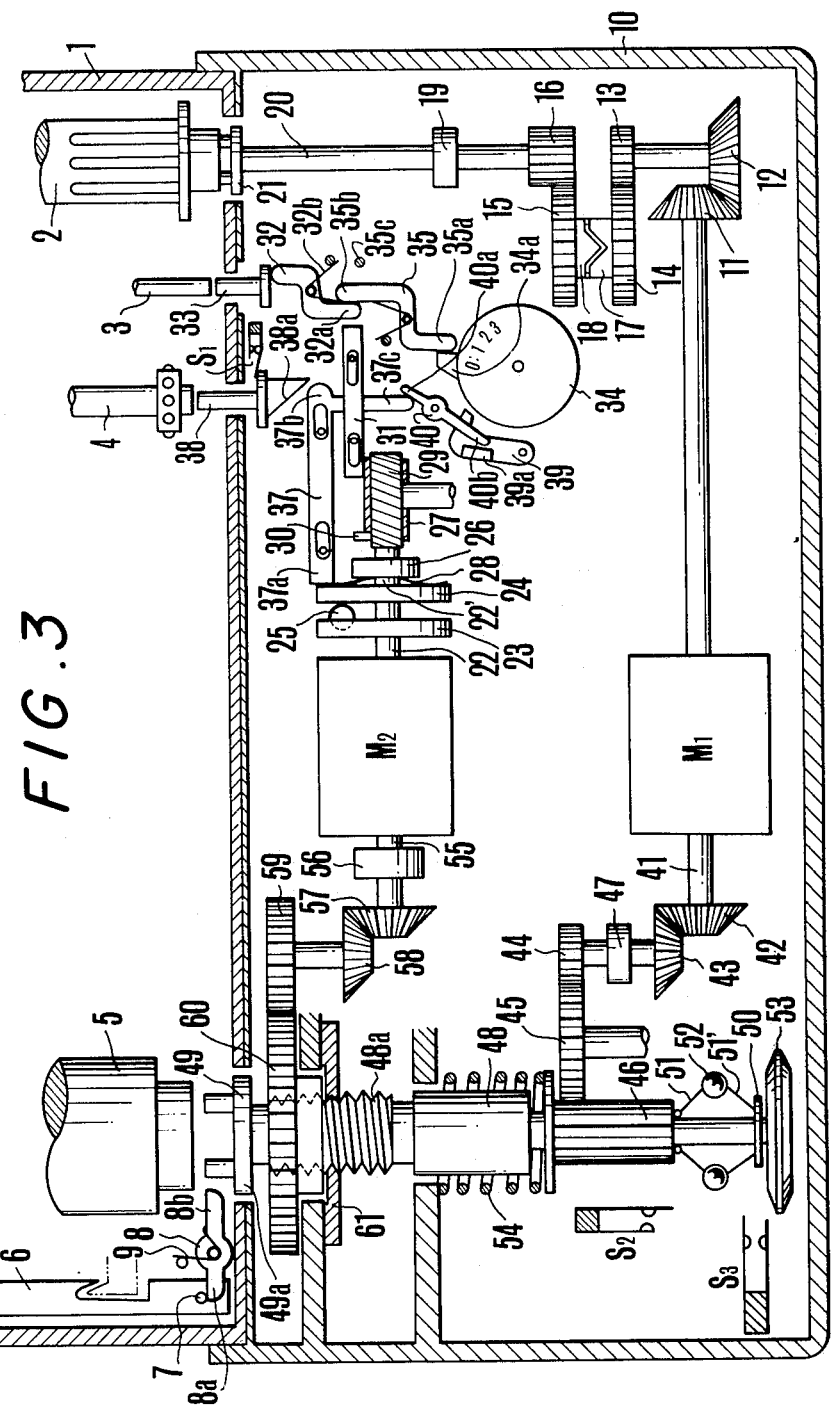

CAMERA HAVING AN ELECTRIC DRIVING DEVICE

DETAILED EXPLANATION OF THE INVENTION

The present invention relates to an electric driving device for performing fully automatically the various photographing operations in a camera, that is from film wind-up, shutter release to film rewinding.

While an electric driving device for improving snappy photographing characteristics and easiness in handling of a camera as well as for allowing remote control thereof has been devised in various ways, conventionally known driving devices are so made that film wind up and shutter release action are carried out in proper sequence by using a wind up completion signal which is generated by a sensor, etc. to detect the variation in wind-up torque and a shutter release completion signal such as a rear screen running signal to detect the running of a shutter rear screen, etc. But since some manual handling is necessary such as disconnecting a sprocket wheel and a wind up device or coupling of a film feed spool and a rewinding axle, etc. in changing over to film rewinding, there are certain inconveniences in snappy photographing characteristics and remote control.

The present invention is intended to provide an electric driving device in which the shortcomings of conventional devices are eliminated. For achieving said object, the present invention is so composed that each action for photographing is automatically done by a sequence control to conduct each action following a predetermined program. That is, in commencing photographing, first shutter release operation is performed and a shutter release completion signal is received by a shutter rear screen running signal, etc. to conduct film wind up operation. At the time when film wind up is completed, a wind up completion signal by a torque sensor, etc. is received and a shutter release is performed again. After repeating the above mentioned operations a signal for completing photographing of a predetermined number of film frames is received and a signal for completion of film rewinding completion such as sprocket release, etc. is received to start film rewinding. After completing rewinding, a rewinding completion signal is received and a back lid of camera is opened and at the same time every part is returned to the initial state to stop the operations. Each of above operations is to be done automatically in proper sequence by giving and receiving signals.

In the present invention, the coupling of a spool axle within a film feeding magazine and an electric motor is performed by giving and receiving of electric signals only as mentioned above, thus no manual handling is necessary and film rewinding is done automatically. Further by the present invention even when a shutter button of a camera is locked by accident during photographing, shutter release operation and film wind up operation are suspended at said moment. Therefore troubles as may be caused by excessive load bearing on a camera or an electric driving device can be avoided, and the present invention thus has great advantages in using a camera.

Now the present invention will be explained in detail by referring to the drawings.

FIG. 3 and FIG. 4 are composition drawings of an electric driving device of the present invention showing, respectively, a state when photographing of a predetermined number of frames is completed and a state when a film is rewound.

Figure 1:
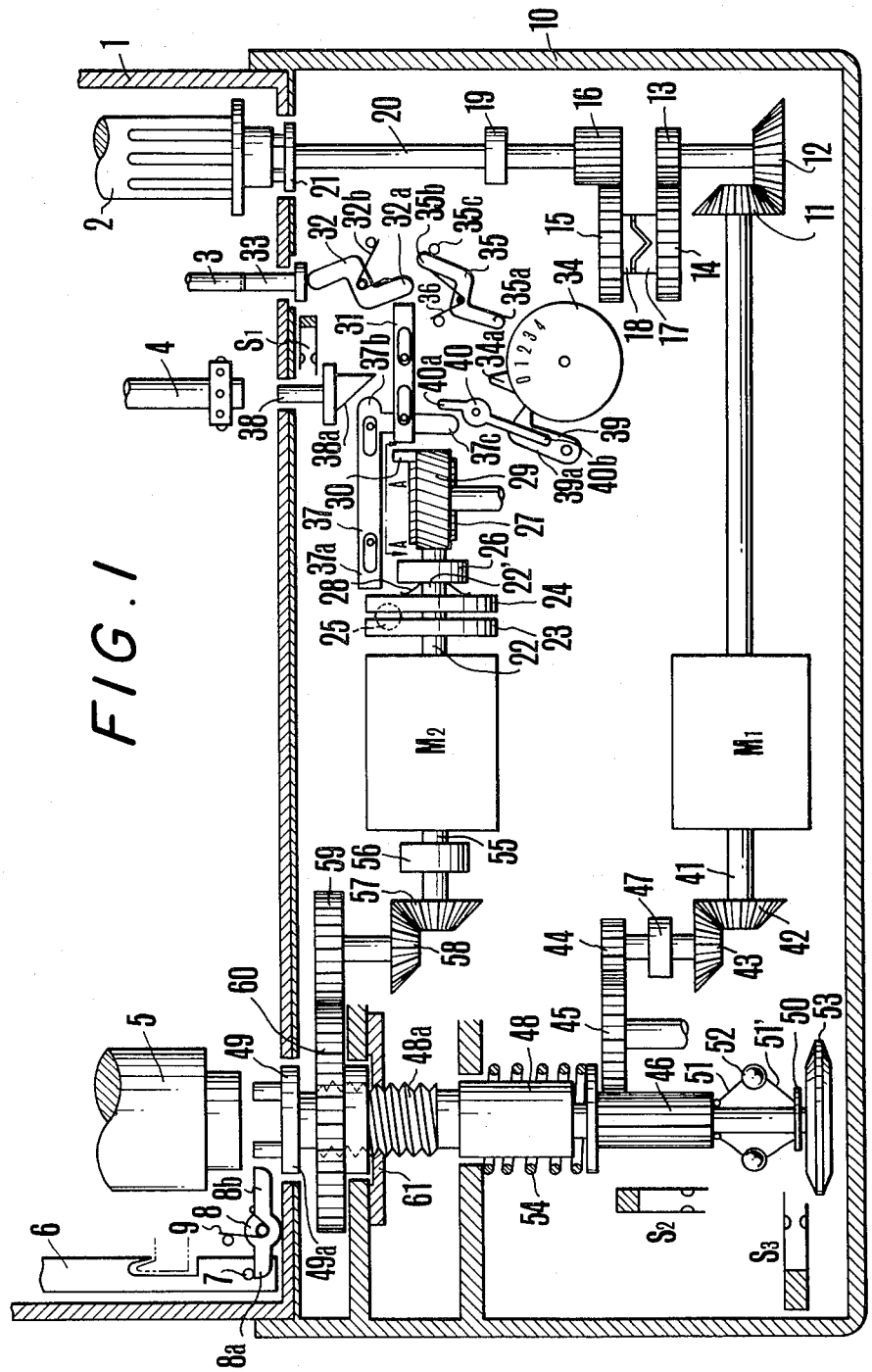
FIG. 1 is a composition drawing of an electric driving device according to the present invention, showing a state of the time when shutter release is done.

In FIG. 1, 1 is a camera main body, 2 is a film take up spool which is loosely fitted around a take up axle of a camera, and 4 is a sprocket wheel, wherein the spool 2 and the sprocket wheel 4 are linked with said take up axle and a shutter charge mechanism through a gear train which is not shown in the drawing, and the sprocket wheel is so made as having a conventionally known clutch and being separated from said gear train at the time of film rewinding and becoming freely rotatable. 3 is a rod for shutter release. 6 is a back lid opening and closing member for a camera, which is so constructed that a back lid is opened by pulling the member 6 upward in the drawing. 7 is a pin on the back lid opening and closing member and one end 8a of a lever 8, which is axially supported on the camera main body 1 in a rotatable manner, is engaged with said pin 7. The lever 8 is biased to clockwise direction in the drawing by a spring 9 and is normally engaged with the pin 7 and is stopped. 10 is an electric driving device mounted to the lower part of the camera main body. $M_1$, $M_2$ are motors within the electric driving device. The axle at one end of the motor $M_1$ is coupled with a wind up axle 20 through a gear train 11 to 16 and one way clutch 19 which transmits only the rotating force to one direction. The wind up axle 20 is coupled with the take up axle of camera through a wind up coupler 21. The only way clutch 19 is so made that its rotating power is transmitted to the spool 2 only when the motor $M_1$ makes normal rotation.

A torque sensor for detecting the change in rotating torque of the wind up axle is provided between a gear 14 and a gear 15. Said torque sensor is made of a member 17 which is formed integrally with the gear 14 and has a V-shaped groove, and a member 18 which is formed integrally with the gear 15 and has such projection as fitting with said groove, wherein both members are pressure contacted together by a spring which is not shown in the drawing and rotate integrally to transmit driving force, and when the rotating torque exceeds a predetermined value, the member 18 ascends against said spring, and a wind up completion signal is generated by such method as described in detail in the U.S. Pat. application Ser. No. 388,270.

Figure 2:
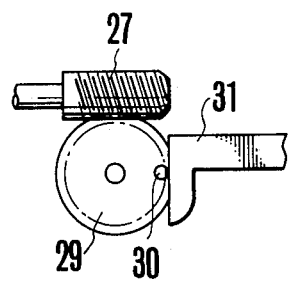
FIG. 2 is a drawing to show the state of engagement of worm parts in FIG. 1.

A worm 27 is coupled with an axle 22 at one end of the motor $M_2$ through ball clutches 23, 24, 25 which detect a signal for completing photographing predetermined number of frames and a one way clutch 26. In the ball clutch part, a fixed disk 23 is fixed to the axle 22 and a movable disk 24 is attached to another axle 22' which is a separate axle from the axle 22 in such manner as slidable only to axial line. A ball 25 normally drops into a concave part in the disks 23 and 24 and is pushed down by a spring 28. When excessively large torque works on the axle 22, the ball comes out of the concave part in the disk 24 to shift the disk 24 to right hand direction in FIG. 1. The one way clutch 26 is made so as to transmit the rotating power of the motor $M_2$ to the worm 27 only when the motor $M_2$ makes normal rotation. A worm wheel 29 engages with the worm 27 as shown in FIG. 2 and a pin 30 is planted at its upper part. 31 is a lever which can be slided to left and right direction in FIG. 1, and 32 is a conversion lever to convert the movement in lateral direction of the lever 31 to the vertical movement of a shutter release rod 33 within the electric driving device, and is axially supported to the electric driving device main body 10 in a rotatable manner and is normally biased to rotate in clockwise direction in FIG. 1 by a spring 32b. 34 is a film counter provided within the electric driving device and has a means to set photographing frame number corresponding to the length of film although being omitted from the drawing and is rotated a scale by a scale charging a return spring not shown in the drawing in an association with a wind up device by a conventionally known method to indicate the number of remaining film. 39 is a reverse rotation prevention claw for the scale plate 34. 35 is a blocking lever to block the action of the lever 32 and is normally biased in the clockwise direction in the drawing by a spring 36 and comes in contact with a stopper 35c and is stopped at such position as not engaging with the lever 32, and the block lever is so made that when the counter 34 is rotated to a position to show the number "0" of remaining frame, the lever 35 is rotated to counter clockwise direction as the projection 34a of the counter engages with one end 35a of the lever, for blocking the action of the lever 32. 37 is a lever which can be slided to left and right direction and one end 37a thereof engages with the disk 24. 38 is a clutch releasing button for the above mentioned sprocket and its slanted part 38a engages with the one end 37b of the lever 37. 39 is an advancing claw to advance the film counter one scale by a conventionally known method. 40 is a counter resetting lever and is axially supported to the electric driving device main body in a rotatable manner. One end 40a of the lever 40 engages with a protruding part 37c of the sliding lever 37 while the other end 40b engages with a protruding part 39a of the advancing claw 39. The other axle 41 of the motor $M_1$ is coupled with a rewinding axle 48 through a gear train 42, 43, 44, 45, 46 and an one way clutch 47. The one way clutch 47 is so made that its rotating power is transmitted to the rewinding axle only when the motor $M_1$ makes reverse rotation. There is a screwed part 48a at the upper part of the rewinding axle 48, further a rewinding coupler 49 is attached to upper end of the same. Also a disk 50 which may be slided in vertical direction is attached to the lower part of the geared part 46 of the rewinding axle 48. And weight 52 are provided in place by bars 51, 51' which are axially supported to said disk 50 and the rewinding axle 48 in a rotatable manner. Therefore the weight 52 are so composed that they are expanded to outside direction according to the rotating speed of the rewinding axle 48 by its centrifugal force. A disk 53 to activate a switch $S_3$ is fixed at the lower end of the rewinding axle. Also the rewinding axle 48 is biassed by the spring 54 and is normally stopped at the position shown in FIG. 1. The other axle 55 of the motor $M_2$ is coupled with a gear 60 through an one way clutch 56 and a gear train 57, 58, 59. The one way clutch 56 is so composed that its rotating power is transmitted to the gear 60 only when the motor $M_2$ makes reverse rotation. The gear 60 is rotatably attached to the electric driving device main body in such manner as being unable to move in a vertical direction, and has screwed part at the hole of its central part and said screwed part engages with the screwed part 48a of the rewinding axle 48. Also the screwed part of the rewinding axle 48 engages with the screwed part 61 which is fixed to the camera main body. $S_1$ is a switch of normally opened type and becomes ON as the clutch releasing button 38 of the sprocket is pushed up to detect rewinding preparation completion signal. $S_2$ is a switch of normally opened type and becomes ON as the weights 52 are pushed open by centrifugal force to detect the rewinding completion signal. $S_3$ is a switch of normally opened type and becomes ON momentarily only when the rewinding axle 48 comes down by the disk 53 to detect that all operations are completed.

Figure 5:
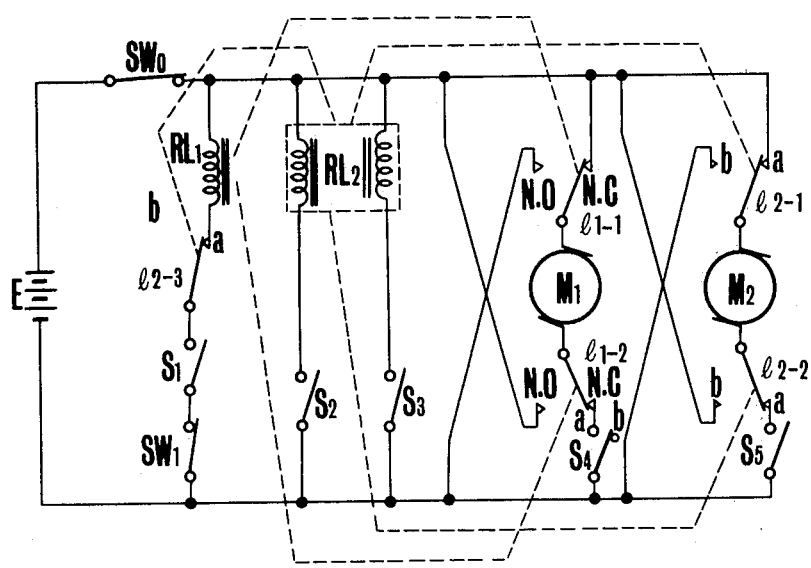
FIG. 5 is a circuit connection diagram of the above mentioned device.

FIG. 5 is a connection diagram to show an example of the circuit of the electric driving device of the present invention. In the drawing E is a power source battery, $Sw_0$ is a power source switch, $Sw_1$ is a switch to control the automatic rewinding operation, and when it is placed in OFF state the rewinding will not be done in a photographing completion state. $S_1$, $S_2$, $S_3$ are normally opened type switches shown in FIG. 1, FIG. 3, FIG. 5. $S_4$ is a switch which becomes ON by exposure completion signal of a camera and becomes OFF by a member which is linked with the torque sensors 17, 18 as wind up is completed. $S_5$ is a switch which becomes ON by a member linked with the torque sensors 17, 18 as the shutter release button not shown in the drawing is passed or as wind up is completed, and becomes OFF by returning action of the release bar 33. Since the method of controlling the wind up and shutter release is same as that described in the U.S. Pat. application Ser. No. 388,270 which has been filed previously, therefore the switches $S_4$, $S_5$ are shown here as being equivalent to what is disclosed in said application. $RL_1$ is a relay to drive change over switches $l_{1-1}$, $l_{1-2}$ by its contact. A relay $RL_2$ drives change over switches $l_{2-1}$, $l_{2-2}$, and $l_{2-3}$, and the motors $M_1$, $M_2$ are made to rotate to normal or reverse direction by said relays. The $M_1$ and $M_2$ are such motors as shown in FIG. 1 etc.

Figure 4:
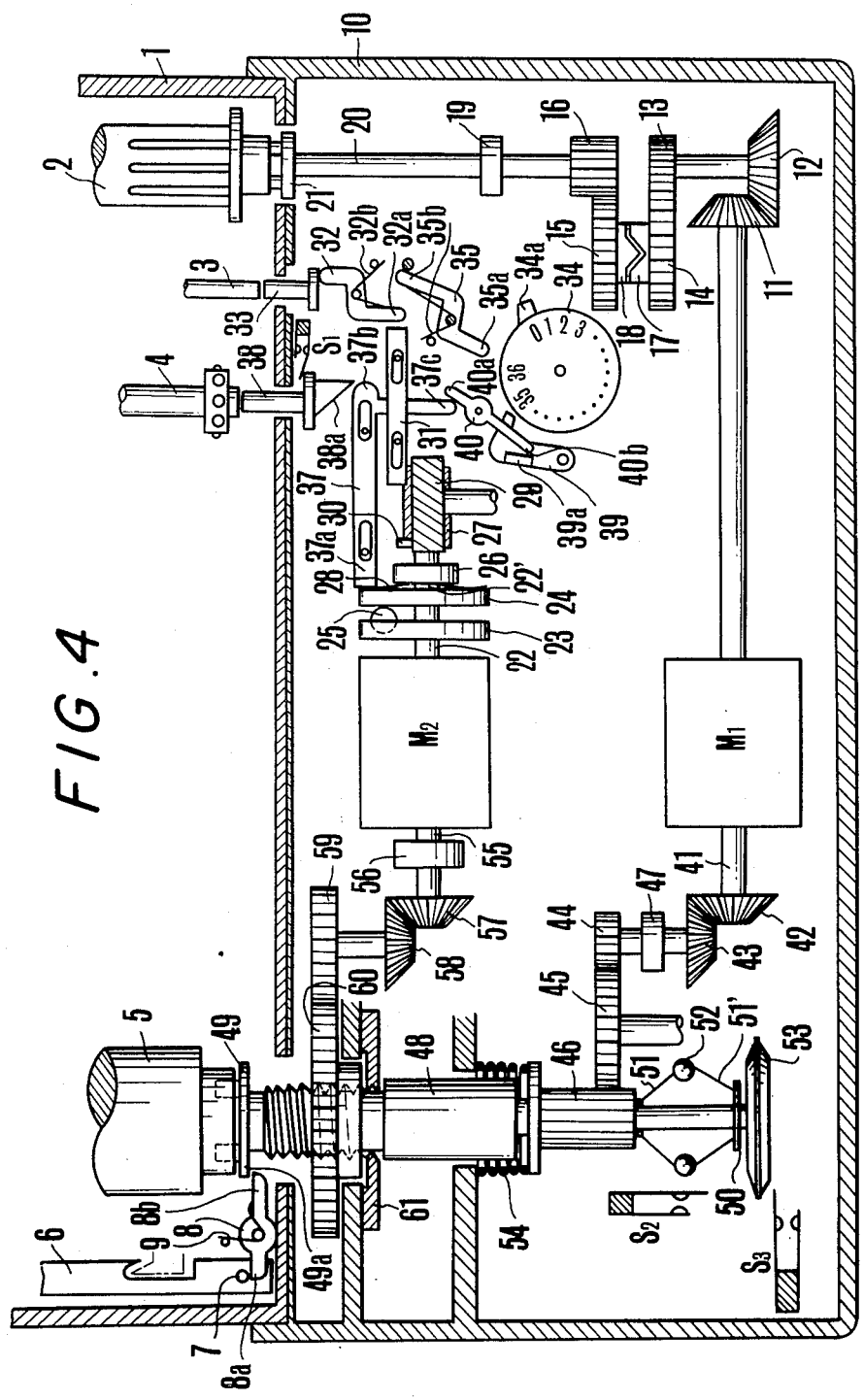

Next function of the above mentioned mechanism will be explained. FIG. 1 shows a state wherein the electric driving device is to conduct shutter release and film wind up at the time of photographing. FIG. 3 shows a state when photographing of a predetermined number of frames is completed. FIG. 4 shows the state when film is rewinded by the electric driving device. First explanations will be made on shutter release and film wind up by the electric driving device.

When the shutter release button of the electric driving device not being shown in the drawing is pressed the switch $S_5$ becomes ON and the motor $M_2$ makes normal rotation, then the worm wheel 29 rotates through the ball clutches 23, 24, 25, one way clutch 26 and the worm 27. Then the lever 31 is shifted to the right direction by the pin 30 on the worm wheel 29 to push up the shutter bar 3 of a camera through the bar 33 of the lever 32, thus exposure of a camera is started. After the shutter bar 3 is pushed up the switch $S_5$ is opened and $M_2$ stops rotation. Next the switch $S_4$ becomes ON by the exposure completion signal of a camera and the motor $M_1$ makes normal rotation and the wind up axle of a camera is rotated through the gear train 11, 12, 13, 14, 15, 16 and the torque sensors 17, 18 and the one way clutch 19 to perform shutter charge and film wind up. As film is advanced as much as one frame the wind up device is stopped and the torque sensors 17, 18 detect the completion of wind up, thus the switch $S_4$ becomes OFF and the motor $M_1$ stops rotation and the switch $S_5$ becomes ON, then the motor $M_2$ starts normal rotation to perform shutter release. As photographing of predetermined length of film is completed after repeating said operations, the remaining number of the counter 34 in the electric driving device becomes 0. Then as shown in FIG. 3 the projected part 34a of the counter 34 engages with one end 35a of the lever 35 to rotate the lever 35 to counter clockwise direction against the springs 36. As the lever 35 is rotated to counter clockwise direction the other end 35b of the lever 35 engages with one end 32a of the lever 32 to block the rotation of the lever 32. Therefore, the rotation of the worm 27 is blocked through the lever 31, the pin 30 and the worm wheel 29, thus excessively large torque works on the ball 25 as $M_2$ makes normal rotation in a shutter release action. Then the ball 25 comes out of the concave part of the disk 24 and the disk 24 is shifted to right direction against the spring 28 thereby the sliding lever 37 is shifted to right direction. As the slanked side 38a of the sprocket release button 38 is pushed by the one end 37b of the lever 37. The button 38 moves to upper direction to separate the sprocket from the wind up gear train to make preparation for film rewinding. Since the projected part 37c of the lever 37 moves to right direction at the same time the advancing claw 39 is rotated to counter clockwise direction through the lever 40 releasing its engagement with the counter 34a, thus the counter 34 becomes free and is returned to its starting position by a spring not shown in the drawing. Also since the switch $S_1$ becomes ON as the sprocket releasing button 38 moves to upper direction, the relay $RL_1$ becomes ON in the circuit diagram of FIG. 5 to change over the switches $l_{1-1}$ and $l_{1-2}$ from N.c side to N.o side. Then the motor $M_1$ starts reverse rotation and its driving power is transmitted to the rewinding axle 48 through the gear train 42, 43, 44, 45 and 46 and the one way clutch 47 to rotate the rewinding axle. Since the screwed part 48a of the rewinding axle is engaged with the screw 61 fixed on the electric driving device, the rewinding axle is pushed upward as it is rotated and the coupler 49 at the upper end engages with the claw in the film feeding spool 5. At this time since the rotation of the rewinding axle is fast the weight 52 is pushed open to outside by its centrifugal force, but it will not come to the position to put the switch $S_2$ in ON state until the axle 48 is completely pushed up. When the axle 48 is completely pushed up since the coupler 49 engages with the spool 5 already, its rotation becomes slow and the weights 52 can not be expauded to the position to put the switch $S_2$ in ON state. Therefore the switch $S_2$ will not become ON in this state. When the rewinding axle is pushed up to the state shown in FIG. 4 the engagement between the screws 48a and 61 is released and the rewinding axle 48 continues rotation only at said position to rewind film. Since the friction of the magazine 5 becomes small as film rewinding is completed, the rotation of the rewinding axle quickly becomes fast and the weights 52 are pushed open to outside by centrifugal force to place the switch $S_2$ in ON state. As the switch $S_2$ becomes ON the latching relay $RL_2$ in FIG. 5 becomes ON to change over the switches $l_{2-}$, $l_{2-2}$ and $l_{2-3}$ from $a$-side to $b$-side. Then the $RL_1$ becomes OFF to stop the motor $M_1$ and the rewinding axle 48 stops its rotation and at the same time the motor $M_2$ starts reverse rotation. By the reverse rotation of the motor $M_2$ its driving force rotate the gear 60 through the one way clutch 56 and the gear train 57, 58, 59. Since the screwed part of the gear 60 is engaged with the screwed part 48a of the rewinding axle 48 the rotation is stopped and the rewinding axle 48 which has been biassed to lower direction by the spring 54 is pushed down by the rotation of the gear 60. When the rewinding axle moves downward the coupler 49 has its engagement with the claw in the spool released and moves downward, and at that time the disk part 49a of the coupler 49 engages with one end 8b of the lever 8 to rotate the lever 8 to clockwise direction. Then, since the other end 8a of the lever 8 pushes up the pin 7 on the back lid opening and closing member, the back lid opening and closing member 6 is pushed up to open the back lid. Since the disk 53 places momentarily the switch $S_3$ in ON state as the rewinding axle further moves downward, the latching relay $RL_2$ in FIG. 5 works to return the switches $l_{2-1}$, $l_{2-2}$, $l_{2-3}$ from $b$-side to $a$-side and the motor $M_2$ stops rotation thus all operations are finished. While the shutter release member is locked by the scale of counter 34 becoming 0 in the above explanations, when the film run out before the counter scale becomes 0 by mis setting of counter, etc., the torque sensor is activated by the tension of film even if in the middle of wind up and the motor $M_2$ is rotated to perform release action, but the shutter bar 3 is locked by a conventionally known release lock mechanism within a camera as it is in the middle of wind up, therefore the shutter release member 31 is also locked and the above mentioned ball clutch is activated then to release the sprocket. Also it can be done to stop the film without rewinding in a photographing finished state by placing the switch $Sw_1$ (omitted from FIG. 1 to FIG. 4) in FIG. 5 in OFF state.

When the back lid is not to be automatically opened, naturally the back lid may be held in place by hand during the above operation to prevent its automatic opening or a separate member may be provided to lock the back lid so that the opening of back lid can be changed over between automatic and manual by change over of the above mentioned mechanism. The electric driving device in the above example may be integrally made with the camera main body or may be of such type as can be mounted to and dismounted from the same.

As has been explained above according to the present invention operations from photographing start to film rewinding completion can be done in proper sequence in a fully automatic manner by a sequence control, therefore a photographer can only make film loading and film unloading, thus photographing can be done with easier handling and quicker speed. Further, since all operations except loading and unloading of film can be done by giving and receiving of electric signals, photographing with remote control can be done quite easily.

What is claimed is:
1. A camera having an electric driving device for automatically conducting photographing operations such as film winding-up, shutter releasing, preparatory film rewinding, and film rewinding, comprising:
 a film wind-up means, a shutter release means, a preparatory film rewinding means, a film rewinding means and a motor for driving all of said means respectively;
 a first switch means for detecting completion signals of film winding-up operation so as to discontinue the drive for the film wind-up means as well as to start the shutter releasing operation;

a second switch means for detecting completion signals of the shutter releasing operation and to start the film winding-up operation;
means for detecting completion of photographing a predetermined length of film;
means for conducting preparatory film rewinding operation interlocking with said detection means;
third switch means for detecting completion of said preparatory operation to start the film rewinding operation; and
fourth switch means for detecting completion signals of the film rewinding operation so as to discontinue the film rewinding means.

2. A camera according to claim 1, in which said motor is able to reversibly rotate corresponding to the direction of flow of an electric current, and said first to said fourth switch means are respectively adapted to switchover "on" and "off" states of said motor as well as to control the direction of flow of an electric current.

3. A camera having an electric driving device for automatically conducting photographing operations such as film winding-up, shutter releasing and film rewinding, comprising:
a shutter release means;
means for detecting completion of photographing a predetermined length of film;
means for blocking the action of the shutter release means interlocking with said detection means;
a preparatory film rewinding means; and
a means for driving said shutter release means, said drive means effecting the actuation of said preparatory film rewinding means when the action of said shutter release means is being blocked by said blocking means.

4. A camera according to claim 3, in which said blocking means is interlocked with a film counter provided within said electric driving device.

5. A camera according to claim 4, in which said drive means actuates the preparatory film rewinding means simultaneously to set the film counter.

* * * * *